(12) United States Patent
Lin

(10) Patent No.: US 11,535,324 B2
(45) Date of Patent: Dec. 27, 2022

(54) SEAT POST ASSEMBLY FOR EASILY ADJUSTING TOTAL HEIGHT OF INNER TUBE

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hisen (TW)

( * ) Notice: Subject to any disclaimer, the term of this patent is extended or adjusted under 35 U.S.C. 154(b) by 0 days.

(21) Appl. No.: 17/374,182

(22) Filed: Jul. 13, 2021

(65) Prior Publication Data

US 2022/0055704 A1 Feb. 24, 2022

(30) Foreign Application Priority Data

Aug. 18, 2020 (TW) ................................. 109210690

(51) Int. Cl.
*B62J 1/08* (2006.01)

(52) U.S. Cl.
CPC ....................................... *B62J 1/08* (2013.01)

(58) Field of Classification Search
CPC .............................. B62J 2001/085; B62J 1/08
See application file for complete search history.

(56) References Cited

U.S. PATENT DOCUMENTS

| 10,787,215 | B1* | 9/2020 | Staples | ...................... B62J 1/08 |
| 2019/0002048 | A1* | 1/2019 | Winefordner | ........... F16B 7/105 |
| 2019/0308681 | A1* | 10/2019 | Staples | ...................... B62J 1/08 |
| 2021/0094642 | A1* | 4/2021 | Dubois | ...................... B62J 1/08 |

FOREIGN PATENT DOCUMENTS

| CA | 3053537 A1 * | 2/2020 | ................ B62J 1/08 |
| CN | 111846044 A * | 10/2020 | |
| CN | 112606930 A * | 4/2021 | ................ B62J 1/08 |
| KR | 20080013140 A * | 8/2006 | |
| KR | 20170087312 A * | 1/2016 | |
| TW | M576558 U | 4/2019 | |
| TW | M576558 U | 4/2019 | |
| WO | WO-89/05752 A1 | 6/1989 | |

* cited by examiner

*Primary Examiner* — Timothy J Brindley
(74) *Attorney, Agent, or Firm* — Muncy, Geissler, Olds & Lowe, P.C.

(57) ABSTRACT

A seat post assembly includes an outer tube, an inner tube disposed movably in the outer tube, a sealing element disposed on the top end of the outer tube to fill the gap between the outer and inner tubes, and a bushing rotatably disposed on the top end of the outer tube and penetrated by the inner tube. The bushing has an exposed portion located in the sealing element or the outer tube in such a manner that the exposed portion isn't shielded and can be touchable, and a barrel portion coaxially connected with the exposed portion and located in the outer tube and having a bottom abutted against a protrusion of the inner tube for limiting the ascending height of the inner tube. Therefore, the present invention allows a rider to touch the bushing without taking it out, thereby facilitating the total height adjustment of the inner tube.

7 Claims, 6 Drawing Sheets

SEAT POST ASSEMBLY FOR EASILY ADJUSTING TOTAL HEIGHT OF INNER TUBE

BACKGROUND OF THE INVENTION

1. Field of the Invention

The present invention relates to a bicycle sear post and more particularly, to a seat post assembly that is easy to adjust the total height of an inner tube.

2. Description of the Related Art

The height of the bicycle seat will affect comfort and safety of riding. The current structure is equipped with an adjustable seat post that can be operated to adjust the height of the seat according to the rider's body shape, rider's habits and riding environment, such that the adjustable seat post allows the rider to ride in the correct posture, thereby improving riding comfort and safety.

However, the inner tube can be lowered to achieve the effect of saving storage space of the adjustable seat post. After the inner tube is lowered, the height of the inner tube needs to be re-adjusted if the rider would like to use it on the next ride. The rider may spend a lot of time looking for a suitable height of the inner tube. This will cause inconvenience and trouble to the rider.

TW Patent No. M576558 discloses a limiting bushing that uses the height difference design of the limiting grooves to resist the protrusion of the inner tube, so that the inner tube cannot be lifted to achieve the effect of adjusting the total height of the inner tube. However, the limiting bushing is hidden in the cap, such that when the rider would like to turn the limiting bushing to adjust the total height of the inner tube, the cap must be removed to expose the limiting bushing for allowing the limiting bushing to be turned. After the adjustment of the inner tube is completed, the cap needs to be reinstalled. As such, it is inconvenient for the rider to operate.

SUMMARY OF THE INVENTION

It is a primary objective of the present invention to provide a seat post assembly, which is easy to adjust the total height of an inner tube.

To attain the above objective, the seat post assembly of the present invention comprises an outer tube, an inner tube, a sealing element, and a bushing. The inner tube is movably disposed upwards and downwards in the outer tube. The top end of the inner tube is located outside the outer tube and the bottom end of the inner tube is received in the outer tube. Further, the outer surface of the bottom end of the inner tube has a protrusion. The sealing element is disposed on the top end of the outer tube and fills a gap between the outer tube and the inner tube. The bushing is rotatably disposed on the top end of the outer tube and penetrated by the inner tube. Further, the bushing includes an exposed portion located in the sealing element or the outer tube in such a manner that the exposed portion is not shielded and can be touchable, and a barrel portion coaxially connected with the exposed portion and located in the outer tube and provided with a bottom abutted against the protrusion of the inner tube for limiting the ascending height of the inner tube.

It can be understood from the above illustration that after the inner tube reaches a desired height, the bushing is turned to enable the bottom of the bushing to be abutted against the protrusion of the inner tube, thereby completing the adjustment of the total height of the inner tube. By this way, the inner tube can be quickly adjusted from a lower level to the desired height without repeated adjustments, so as to save operation time and increase the convenience of use. As for the seat post assembly of the present invention, the exposed portion allows a rider to conveniently turn the bushing, so that the bushing can be rotated without taking it out, thereby increasing the convenience of operation.

Preferably, the exposed portion of the bushing is touchable through at least one hollow slot provided at the sealing element or the top end of the outer tube.

Preferably, the bottom of the barrel portion has a plurality of limiting slots arranged in a stepped manner along the axial direction of the inner tube. The bushing is abutted against the protrusion of the inner tube through one of the limiting slots.

Preferably, the outer surface of the exposed portion has an anti-slip pattern that facilitates the application of force to the exposed portion.

Preferably, the bushing has an outer flange connected between the exposed portion and the barrel portion and abutted against an inner flange of the outer tube. By this way, the exposed portion is retained above the top end of the outer tube.

Preferably, the inner surface of the top end of the outer tube has a plurality of positioning grooves arranged in an equally-spaced manner around the axis of the outer tube. The barrel portion of the bushing has an elastic positioning portion engaged with one of the positioning grooves to locate the adjustment angle of the bushing.

Other advantages and features of the present invention will be fully understood by reference to the following specification in conjunction with the accompanying drawings, in which like reference signs denote like components of structure.

DETAILED DESCRIPTION OF THE INVENTION

Figure 1:
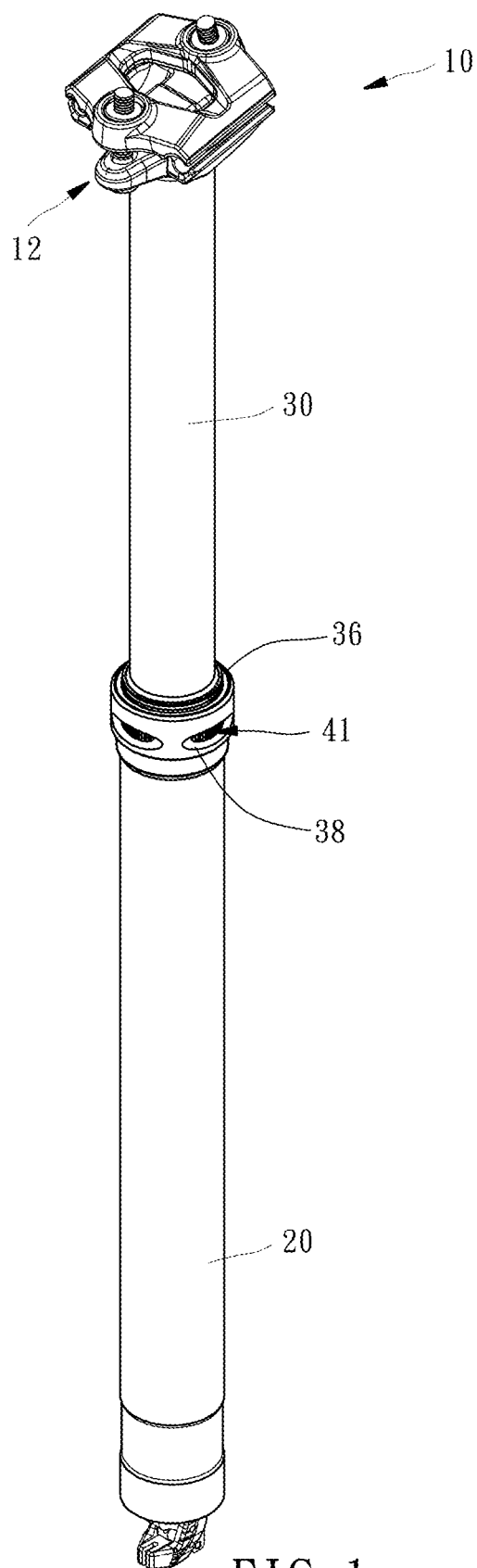
FIG. 1 is a perspective view of a seat post assembly of the present invention.
Figure 2:
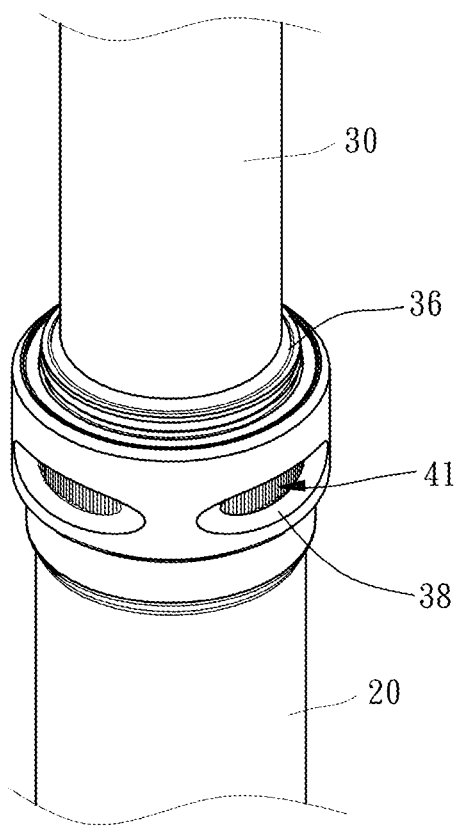
FIG. 2 is a partially enlarged view of FIG. 1.
Figure 3:
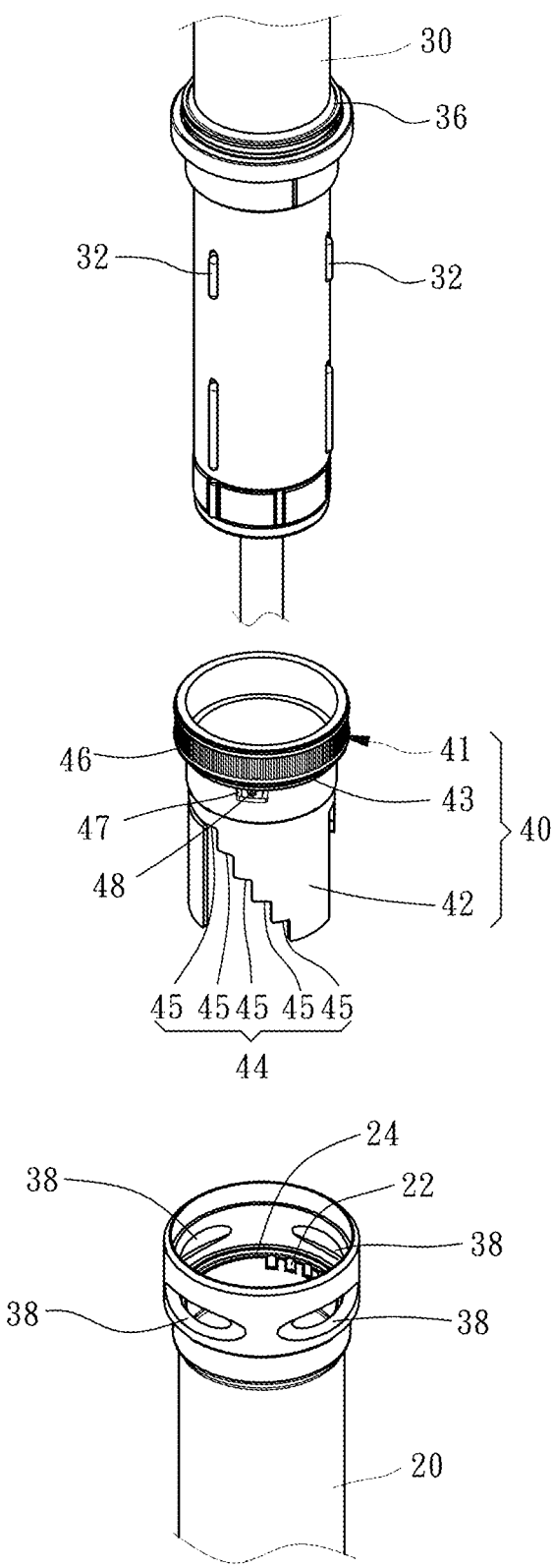
FIG. 3 is a partially exploded perspective view of the seat post assembly of the present invention.

Referring to FIGS. 1 to 3, a seat post assembly 10 of the present invention comprises an outer tube 20, an inner tube 30, a sealing element 36, and a bushing 40.

The top end of the inner tube 30 is located outside the outer tube 20 and equipped with a clamping seat 12 for mounting a seat cushion (not shown). The bottom end of the inner tube 30 penetrates into the outer tube 20 through the top end of the outer tube 20. The outer surface of the bottom end of the inner tube 30 has three straight protrusions 32 (actually, at least one is sufficient). The three protrusions 32 are arranged in an equally-spaced manner relative to the axis of the inner tube 30.

Figure 4:
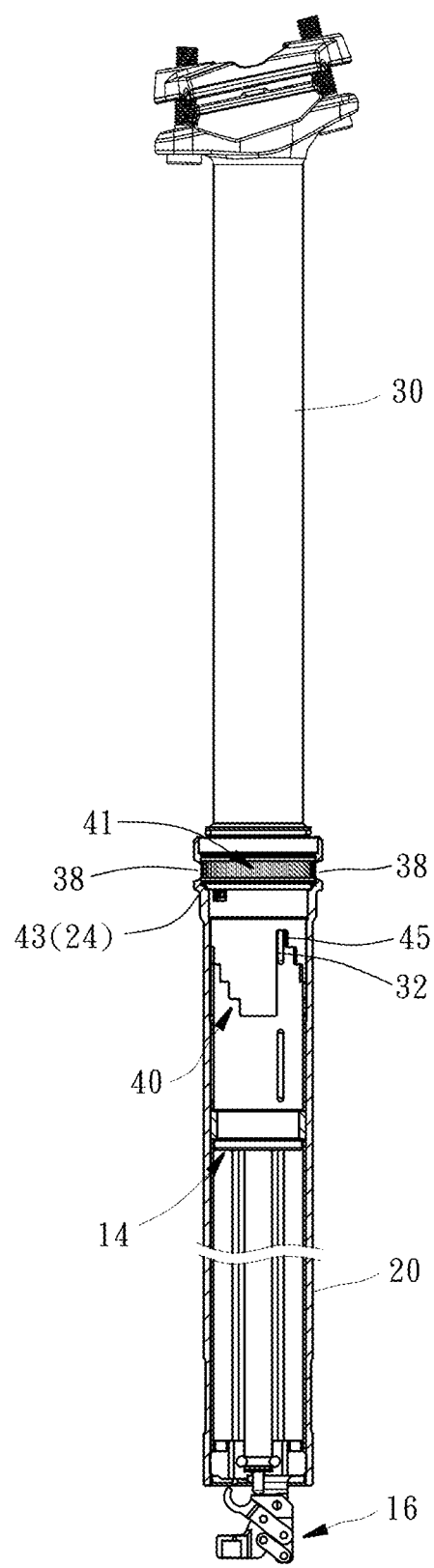
FIG. 4 is a partially sectional view of the seat post assembly of the present invention, showing the uppermost limiting slot of the bushing is abutted against the protrusion of the inner tube.

As shown in FIG. 4, a pneumatic cylinder 14 is disposed in the outer tube 20 and the inner tube 30, and a trigger 16 is provided at the bottom of the outer tube 20. When the trigger 16 is driven by a controller (not shown) to turn on the pneumatic cylinder 14, the inner tube 30 can be lifted or lowered relative to the outer tube 20. If the top end of the inner tube 30 does not bear the weight of the rider, the inner tube 30 will be lifted relative to the outer tube 20, but if the top end of the inner tube 30 bears the weight of the rider, the inner tube 30 will be lowered relative to the outer tube 20.

The sealing element 36 is disposed on the top end of the outer tube 20 and fills a gap between the outer tube 20 and the inner tube 30.

The bushing 40 includes an exposed portion 41, a barrel portion 42 coaxially corresponding to the exposed portion 41, and an outer flange 43 connected between the exposed portion 41 and the barrel portion 42. The bushing 40 is sleeved on the inner tube 30 in such a manner that outer flange 43 of the bushing 40 is abutted against an inner flange 24 of the outer tube 20. The exposed portion 41 of the bushing 40 isn't shielded and can be touchable through at least one oval hollow slot 38. In this embodiment, the number of hollow slots 38 is four and they are arranged on the top end of the outer tube 20 in an equally-spaced manner. Certainly, the hollow slot 38 can be provided at the sealing member 36 according to actual needs. As shown in FIG. 3, the barrel portion 42 of the bushing 40 is located in the outer tube 20 and provided with three bottoms 44 (actually, at least one is sufficient). The three bottoms 44 are arranged in an equally-spaced manner around the axis of the inner tube 30 and located above the protrusions 32 of the inner tube 30. Each of the bottoms 44 is formed by five limiting slots 45 arranged in a stepped manner along the axial direction of the outer tube 20. One of the limiting slots 45 of the bushing 40 is abutted against one of the protrusions 32 of the inner tube 30 (see FIGS. 4 and 5).

Figure 5:
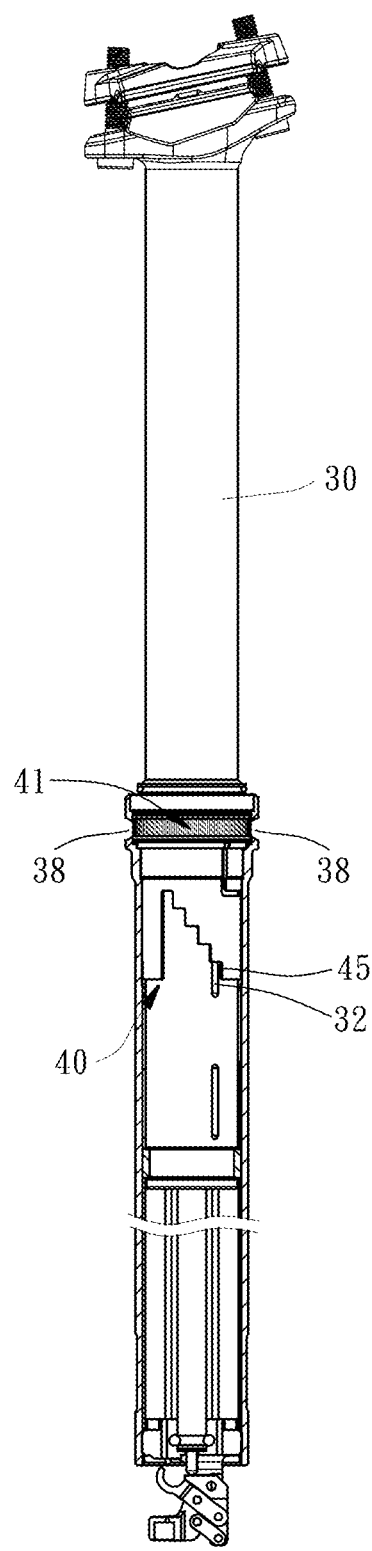
FIG. 5 is similar to FIG. 4, showing the lowermost limiting slot of the bushing is abutted against the protrusion of the inner tube.

It can be seen from the above that when the rider would like to adjust the seat cushion to a desired height, turning on the pneumatic cylinder 14 to lower the inner tube 30 to a lower height, and then turning off the pneumatic cylinder 14 to stop the movement of the inner tube 30. Next, the rider touches the exposed portion 41 of the bushing 40 through one of the hollow slots 38 to rotate the bushing 40 relative to the inner tube 30. At this time, the rider can fine-tune the positions of the inner tube 30 and the bushing 40 according to the actual needs until one of the limiting slots 45 of the bushing 40 is against the protrusion 32 of the inner tube 30. For example, as shown in FIG. 4, the uppermost limiting slot 45 of the bushing 40 is abutted against the protrusion 32 of the inner tube 30; as shown in FIG. 5, the lowermost limiting slot 45 of the bushing 40 is abutted against the protrusion 32 of the inner tube 30. After that, the rider turns on the pneumatic cylinder 14 to adjust the inner tube 30 to a maximum height, and confirms whether the inner tube 30 has been adjusted to the desired height. After confirmation, the total height adjustment of the inner tube 30 is complete.

After the ride is finished, the rider can turn on the pneumatic cylinder 14 to adjust inner tube 30 to a lowest level for facilitating storage. Because the bushing 40 has been adjusted to the desired position according to the rider's needs, the ascending height of the inner tube 30 will be limited through the cooperation between the protrusions 32 of the inner tube 30 and the limiting grooves 45 of the bushing 40 on the next ride, such that there is no need to readjust the height f the seat cushion for the same rider. This can effectively save operation time and increase the convenience of use.

Figure 6:
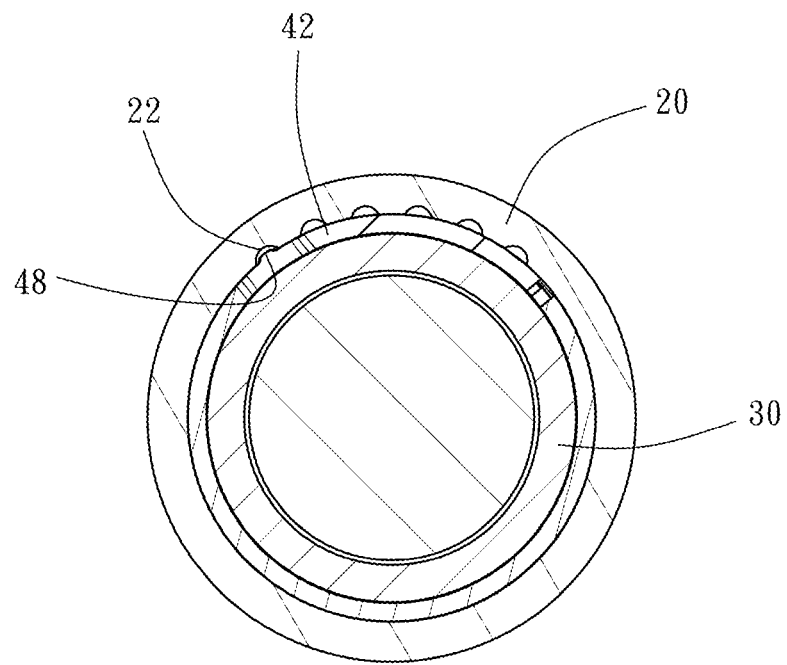
FIG. 6 is a sectional view of FIG. 1.

It should be supplemented that in order to facilitate the application of force to the exposed portion 41 of the bushing 40, anti-slip lines 46 may be provided on the outer surface of the exposed portion 41 to prevent slippage caused by insufficient friction. In addition, as shown in FIGS. 3 and 6, the inner surface of the top end of the outer tube 20 has a plurality of positioning grooves 22 (by taking six as an example, but not limited to this) arranged in an equally-spaced manner relative to the outer tube 20. The barrel portion 42 of the bushing 40 has a slit 47 and an elastic positioning portion 48 surrounded by the slit 47 (as shown in FIG. 3). When the bushing 40 is rotated, the elastic positioning portion 48 is engaged with one of the positioning grooves 22 of the outer tube 20. On the one hand, the bushing 40 is retained in position, and on the other hand, the rider can grasp the rotation angle of the bushing 40 when rotating it. Even the outer surface of the inner tube 30 and/or the outer tube 20 can be further provided with a scale design to improve the adjustment accuracy.

What is claimed is:

1. A seat post assembly comprising:
   an outer tube;
   an inner tube movably disposed upwards and downwards in the outer tube, and having a top end thereof located outside the outer tube and a bottom end thereof received in the outer tube, an outer surface of the bottom end of the inner tube having a protrusion;
   a sealing element disposed on the top end of the outer tube and filling a gap between the outer tube and the inner tube; and
   a bushing rotatably disposed on the top end of the outer tube and penetrated by the inner tube, the bushing including an exposed portion located in the sealing element or the outer tube in such a manner that the exposed portion is not shielded and can be touchable, and a barrel portion coaxially connected with the exposed portion and located in the outer tube and provided with a bottom abutted against the protrusion of the inner tube.

2. The seat post assembly as claimed in claim 1, wherein the sealing element has at least one hollow slot for allowing the exposed portion of the bushing to be touchable.

3. The seat post assembly as claimed in claim 1, wherein the top end of the outer tube has at least one hollow slot for allowing the exposed portion of the bushing to be touchable.

4. The seat post assembly as claimed in claim 1, wherein the bottom of the barrel portion has a plurality of limiting slots arranged in a stepped manner along an axial direction of the inner tube, and one of the limiting slots of the bushing is abutted against the protrusion of the inner tube.

5. The seat post assembly as claimed in claim 1, wherein an outer surface of the exposed portion has an anti-slip pattern.

6. The seat post assembly as claimed in claim 1, wherein the bushing has an outer flange connected between the exposed portion and the barrel portion and abutted against an inner flange of the outer tube.

7. The seat post assembly as claimed in claim 1, wherein an inner surface of the top end of the outer tube has a plurality of positioning grooves arranged in an equally-spaced manner around an axis of the outer tube; the barrel portion of the bushing has an elastic positioning portion engaged with one of the positioning grooves.

* * * * *